(12) United States Patent
Wang et al.

(10) Patent No.: US 10,698,552 B2
(45) Date of Patent: Jun. 30, 2020

(54) TOUCH SUBSTRATE AND TOUCH DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Qingpu Wang, Beijing (CN); Lei Zhang, Beijing (CN); Tsung Chieh Kuo, Beijing (CN); Zhi Zhang, Beijing (CN); Jiawei Xu, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 153 days.

(21) Appl. No.: 15/752,198

(22) PCT Filed: Jul. 31, 2017

(86) PCT No.: PCT/CN2017/095236
§ 371 (c)(1),
(2) Date: Feb. 12, 2018

(87) PCT Pub. No.: WO2018/059111
PCT Pub. Date: Apr. 5, 2018

(65) Prior Publication Data
US 2019/0354240 A1 Nov. 21, 2019
US 2020/0142538 A2 May 7, 2020

(30) Foreign Application Priority Data
Sep. 27, 2016 (CN) .......................... 2016 1 0856232

(51) Int. Cl.
*G06F 3/044* (2006.01)

(52) U.S. Cl.
CPC .. *G06F 3/0446* (2019.05); *G06F 2203/04111* (2013.01); *G06F 2203/04112* (2013.01)

(58) Field of Classification Search
CPC ...... G06F 3/0446; G06F 3/0448; G06F 3/047; G06F 3/044; G06F 2203/04111; G06F 2203/04112
See application file for complete search history.

(56) References Cited

U.S. PATENT DOCUMENTS

2015/0109246 A1  4/2015  Lee et al.
2016/0070389 A1  3/2016  Lee et al.
(Continued)

FOREIGN PATENT DOCUMENTS

CN   202600653 U   12/2012
CN   102880340 A   1/2013
(Continued)

OTHER PUBLICATIONS

International Search Report and Written Opinion, dated Nov. 7, 2017, issued in International Patent Application No. PCT/CN2017/095236; with English translation.
(Continued)

*Primary Examiner* — Dennis P Joseph
(74) *Attorney, Agent, or Firm* — McDermott Will & Emery LLP (57) ABSTRACT

The present disclosure provides a touch substrate and a touch display device. The touch substrate includes: a touch structure, at least a part of which is located in the main touch region; and a connecting member and a wiring, at least partially located in the wiring region, wherein the connecting member is configured to electrically connect the touch structure and the wiring; the connecting member has a hollow portion. Such that, touch sensitivity can be improved.

16 Claims, 6 Drawing Sheets

(56) References Cited

U.S. PATENT DOCUMENTS

| | | | |
|---|---|---|---|
| 2016/0209959 A1* | 7/2016 | Lee | G06F 3/044 |
| 2019/0271911 A1* | 9/2019 | Wu | H05K 3/027 |
| 2019/0271912 A1* | 9/2019 | Li | G03F 7/0007 |

FOREIGN PATENT DOCUMENTS

| | | |
|---|---|---|
| CN | 103197798 A | 7/2013 |
| CN | 103941895 A | 7/2014 |
| CN | 104182104 A | 12/2014 |
| CN | 203983280 U | 12/2014 |
| CN | 104345939 A | 2/2015 |
| CN | 104571687 A | 4/2015 |
| CN | 204808255 U | 11/2015 |
| CN | 205050120 U | 2/2016 |
| CN | 106293255 A | 1/2017 |

OTHER PUBLICATIONS

First Office Action issued in Chinese Patent Application No. 201610856232.6, dated May 4, 2017; with English ranslation.
Search Report dated Mar. 6, 2017, issued in Chinese Patent Application No. 201610856232.6; with English translation.

* cited by examiner

TOUCH SUBSTRATE AND TOUCH DISPLAY DEVICE

CROSS-REFERENCE TO RELATED APPLICATION

This application is a national phase entry under 35 USC 371 of International Patent Application No. PCT/CN2017/095236 filed on 31 Jul. 2017, which claims priority to Chinese Patent Application No. 201610856232.6 filed on Sep. 27, 2016, titled "TOUCH SUBSTRATE AND TOUCH DISPLAY DEVICE", which are incorporated herein by reference in their entirety.

TECHNICAL FIELD

Embodiments of the present disclosure relate to a touch substrate and a touch display device.

BACKGROUND

In recent years, with improvement of controllability of electronic equipment and development of electronic technology, touch screen technology has been widely used in electronic devices such as mobile phones, tablet computers, notebook computers and the like. There have been a variety of technical directions appearing under the development of touch technology, such as resistance, capacitance, and electromagnetism, and the capacitive screen with low cost and excellent user experience has become a mainstream product.

SUMMARY

Embodiments of the present disclosure provide a touch substrate and a touch display device, which can improve touch sensitivity.

An embodiment of the present disclosure provides a touch substrate, which includes: a touch structure, at least a part of which is located in a main touch region; a connecting member and a wiring which are at least partially located in a wiring region, wherein the connecting member is configured to electrically connect the touch structure and the wiring, and the connecting member has a hollow portion.

In one example, the touch substrate further includes an organic layer at least partially located in the wiring region and overlapping the connecting member and the wiring.

In one example, the connecting member is in a mesh structure.

In one example, a length of the connecting member is 1~5 mm.

In one example, a width of connecting member is 0.2~0.3 mm.

In one example, the touch structure includes a first touch electrode and a second touch electrode which are insulated from and intersect with each other, the first touch electrode includes a plurality of first touch sub-electrodes, and the plurality of first touch sub-electrodes are electrically connected by a bridge; the bridge are isolated from the second touch electrode by an insulating layer; the organic layer and the insulating layer are located in a same layer and made of same material.

In one example, the organic layer is a first coating protection layer.

In one example, the bridge, the connecting member and the wiring is in a same layer and made of same material.

In one example, the bridge is in a bar structure; a length of the bridge is 100~300 μm.

In one example, a width of the bridge is 5~10 μm.

In one example, the touch substrate further includes a light shielding layer disposed in the wiring region.

In one example, the light shielding layer is a white light shielding layer or a black light shielding layer.

In one example, the touch substrate further includes a second coating protection layer overlapping the touch structure.

In one example, an explosion-proof film is disposed on the second coating protection layer.

In one example, the connecting member is a metal connecting bar.

Another embodiment of the present disclosure provides a touch display device, which includes a display panel and a touch substrate disposed on a light emitting side of the display panel, wherein the touch substrate is a touch substrate as described above.

In one example, the display panel is a liquid crystal display panel or an organic light emitting diode display panel.

BRIEF DESCRIPTION OF THE DRAWINGS

In order to describe technical solutions in embodiments of the present disclosure more clearly, the accompanying drawings in the embodiments will be introduced briefly. Obviously, the accompanying drawings to be described below merely relate to some embodiments of the present disclosure, but do not constitute a limitation to the disclosure.

DETAILED DESCRIPTION

In order to make purposes, technical solutions and advantages of embodiments of the present disclosure more clear, the technical solutions in the embodiments of the present disclosure will be described clearly and completely with reference to the accompanying drawings in the embodiments of the present disclosure. Obviously, the embodiments to be described are merely a part of but not all of embodiments of the present disclosure. All other embodiments made by a person of ordinary skill in the art without paying any creative effort shall be included in the protection scope of the present disclosure on the basis of the described embodiments of the present disclosure.

One Glass Solution (abbreviated as OGS) technology means that a touch structure is formed on a cover glass, and the cover glass serves dual roles of protection function and touch function at the same time. A light shielding layer that serves roles of shielding wirings and decorative effect is further formed in a wiring region of the cover glass.

Figure 1:
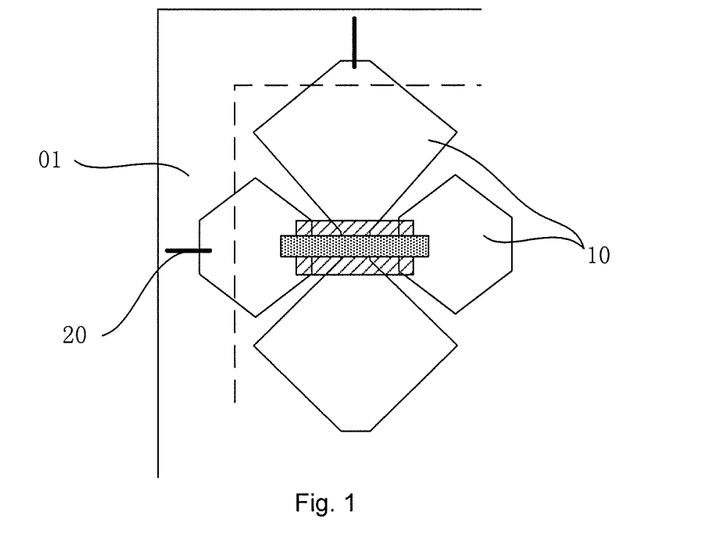
FIG. 1 is a schematic structural view of a touch substrate.

In a touch substrate, as shown in FIG. 1, a touch structure 10 is connected to an IC (Integrated Circuit) via a wiring 20 in a wiring region 01. However, since the area of the wiring 20 is greatly different from that of the touch structure 10, a large metal impedance is easily generated, thereby affecting touch sensitivity.

Figure 2:
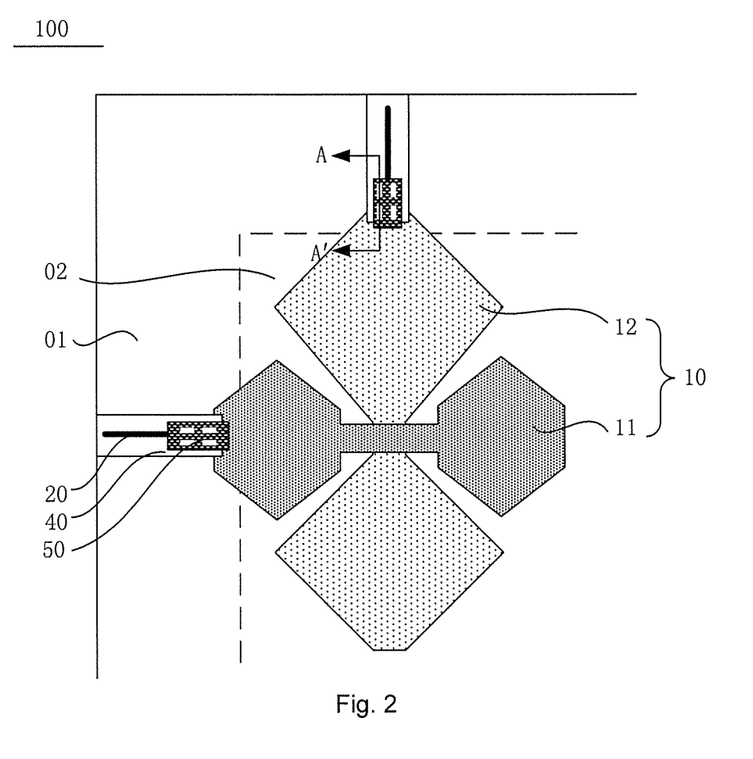
FIG. 2 is a schematic plan structural view of a touch substrate provided by an embodiment of the present disclosure.

An embodiment of the present disclosure provides a touch substrate 100. As shown in FIG. 2, the touch substrate 100 includes a main touch region 02 and a wiring region 01.

The touch substrate 100 includes a base substrate S, and a touch structure 10 disposed on the base substrate S, and the touch structure 10 is in the main touch region 02. The touch structure 10 may be entirely inside the main touch region 02, or as shown in FIG. 2, a part of the touch structure 10 is inside the main touch region 02, while another part is outside the main touch region 02. The touch structure 10 includes a first touch electrode 11 and a second touch electrode 12 which are insulated from and intersect with each other.

The touch substrate 100 includes an organic layer 40 disposed in the wiring region 01. The organic layer 40 may be entirely disposed inside the wiring region 01, or a part of the organic layer 40 is inside the wiring region 01, while another part is outside the wiring region 01.

Figure 3:
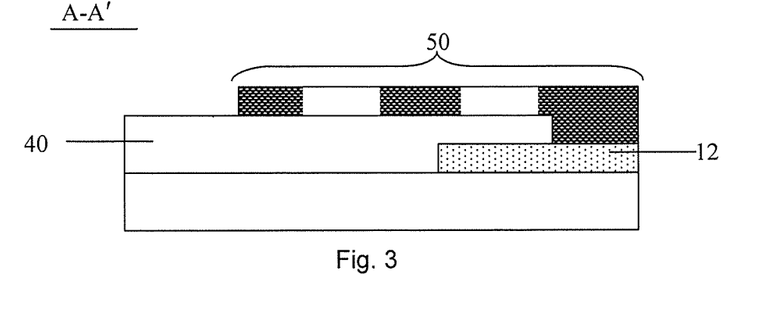
FIG. 3 is a cross-sectional view along the direction of A-A' in FIG. 2.
Figure 4A:
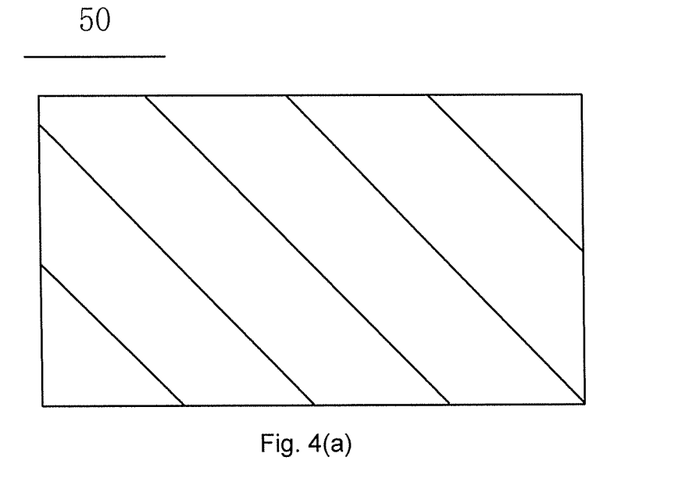
FIG. 4(a) is a schematic structural view of a metal connecting bar provided by an embodiment of the present disclosure.
Figure 4B:
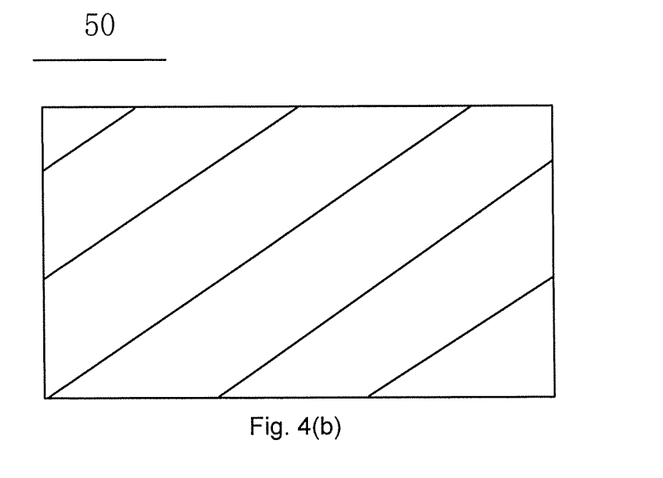
FIG. 4(b) is a schematic structural view of a metal connecting bar provided by an embodiment of the present disclosure.

The touch substrate 100 further includes a connecting member and a wiring 20 disposed on the organic layer 40. The connecting member and the wiring 20 may be entirely located inside the wiring region 01, or partially located inside the wiring region and partially located outside the wiring region. That is, the organic layer 40 overlaps the connecting member and the wiring 20. The connecting member may be a metal connecting bar 50, and the metal connecting bar 50 is used for electrically connecting the first touch electrode 11 as well as the second touch electrode 12 to the wiring 20 respectively. As shown in FIGS. 3, 4(a) and 4(b), the metal connecting bar 50 has a hollow portion. Here, the hollow portion means, for example, an opening in a thickness direction (for example, in a direction perpendicular to the base substrate S) of the metal connecting bar 50.

For example, a contact area between the metal connecting bar 50 and the touch structure (for example, the first touch electrode 11 or the second touch electrode 12) is larger than that between the metal connecting bar 50 and the wiring 20. Here, the contact area between the metal connecting bar 50 and the touch structure means, for example, a direct contact area between the metal connecting bar 50 and the touch structure. And the contact area between the metal connecting bar 50 and the wiring 20 means, for example, a direct contact area between the metal connecting bar 50 and the wiring 20.

It should be noted that, firstly, the touch structure 10 is not limited, as long as the touch function can be realized, and the touch structure 10 in FIG. 2 is merely illustrative.

Secondly, the main touch region 02 is a region for picture display when the touch substrate 100 is applied to a display device. The wiring region 01 is located on the periphery of the main touch region 02.

Thirdly, the specific shape of the metal connecting bar 50 is not limited, as long as the metal connecting bar 50 has a hollow portion. The metal connecting bar 50 in FIG. 2, 3, 4(a) or 4(b) is merely illustrative.

Fourthly, for any metal connecting bar 50, one end of it is electrically connected to the first touch electrode 11 or the second touch electrode 12, and the other end is electrically connected to the wiring 20, such that the first touch electrode 11 or the second touch electrode 12 is electrically connected to the wiring 20.

The wire 20 and the metal connecting bar 50 may be disposed in a same layer or in different layers, which is not limited herein.

Fifthly, the relative position of the organic layer 40 and the touch structure 10 is not limited, and FIG. 2 is merely illustrative.

The embodiment of the present disclosure provides a touch substrate 100. By disposing the metal connecting bar 50 in the wiring region 01 of the touch substrate 100, the first touch electrode 11 as well as the second touch electrode 12 are electrically connected with the wiring 20 though the metal connecting bar 50, respectively. The contact area between the wiring 20 and the first touch electrode 11, and the contact area between the wiring 20 and the second touch electrode 12 are accordingly increased and thus metal impedance is reduced, so touch sensitivity is improved.

When the metal connecting bar 50 is disposed on the organic layer 40, the adhesion of the metal connecting bar 50 to the organic layer 40 is small due to differences in material properties between the metal connecting bar 50 and the organic layer 40. And when the metal connecting bar 50 is formed on the layer 40, a defect is easily formed between the organic layer 40 and the metal connecting bar 50, and the adhesion at the defect position is worse. In this way, when the touch substrate 100 needs rework, such as analysis, disassembly, repair or the like, the metal connecting bar 50 is to be subjected to a force in a tearing direction which makes the metal connecting bar 50 separated from the organic layer 40. As a result, the metal connecting bar 50 is separated from the first touch electrode 11 or the second touch electrode 12, and thus signals on the touch structure 10 are unable to be transmitted to the IC, thereby affecting the touch function of a product and reducing product yield. Based on this, by making the metal connecting bar 50 have a hollow portion, the embodiment of the present disclosure may reduce the contact area between the metal connecting bar 50 and the organic layer 40, and thus reduce the probability of forming defects, resulting in reducing the probability of a separation between the metal connecting bar 50 and the organic layer 40 and improving the product yield.

Figure 4C:
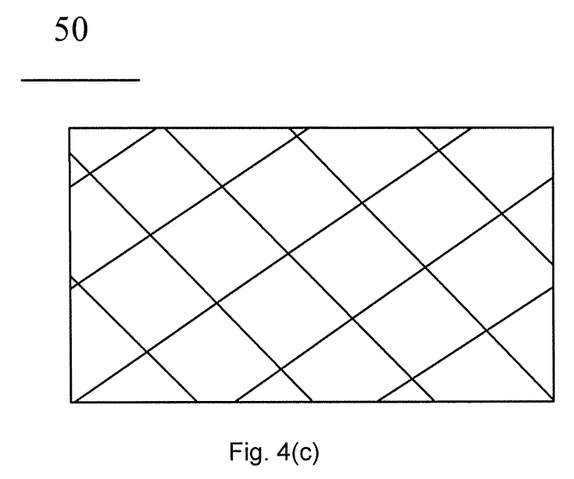
FIG. 4(c) is a schematic structural view of a metal connecting bar provided by an embodiment of the present disclosure.
Figure 4D:
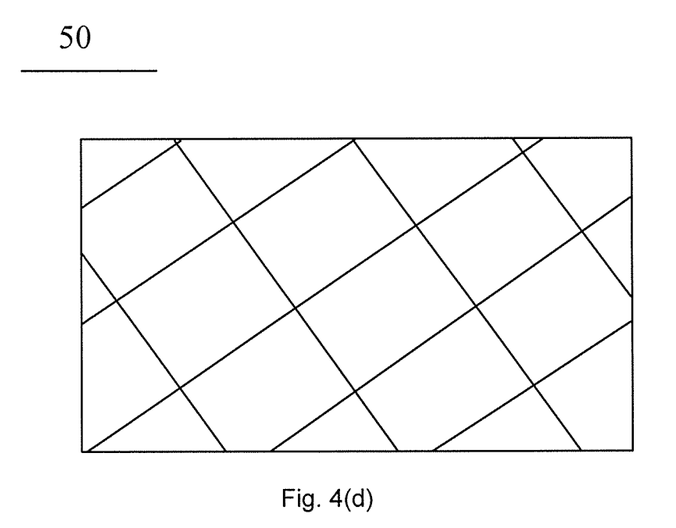
FIG. 4(d) is a schematic structural view of a metal connecting bar provided by an embodiment of the present disclosure.

For example, the metal connecting bar 50 has a mesh structure as shown in FIG. 4(c) or 4(d).

Specific pattern of the mesh is not limited. For example, the pattern of the mesh may be in rhombus as shown in FIG. 4(c), or the pattern of the mesh may be in rectangle as shown in FIG. 4(d). Of course, the pattern of the mesh may be in another shape.

In the embodiment of the present disclosure, the metal connecting bar 50 is arranged in a mesh structure. That is, the metal connecting bar 50 includes two intersecting sets of metal wires, and each set of metal wires includes, for example, a plurality of metal wires parallel to each other. The two sets are located in different directions. On one hand, when subjected to an external force in a single direction, if one set of metal wires is separated from the organic layer 40, the other set of metal wires can remain adhering to the organic layer 40 to ensure that signals on the touch structure 10 can be transmitted to the IC, thereby improving the product yield. On the other hand, the contact portion between the metal connecting bar 50 and the organic layer 40 is a plurality of metal wires, and the contact area between the metal wires and the organic layer 40 is small, so as to reduce the probability of forming defects. As a result, the probability of the separation between the metal connecting bar 50 and the organic layer 40 is reduced, and the product yield is improved.

In addition, the metal connecting bar 50 in a mesh structure can be directly formed under one patterning process without affecting formation of other structures and without increasing process difficulty.

In order to simplify the structure of a product, in an embodiment of the present disclosure, for example, the length of the metal connecting bar 50 is 1~5 mm; and/or the width of the metal connecting bar 50 is 0.2~0.3 mm.

Figure 5A:
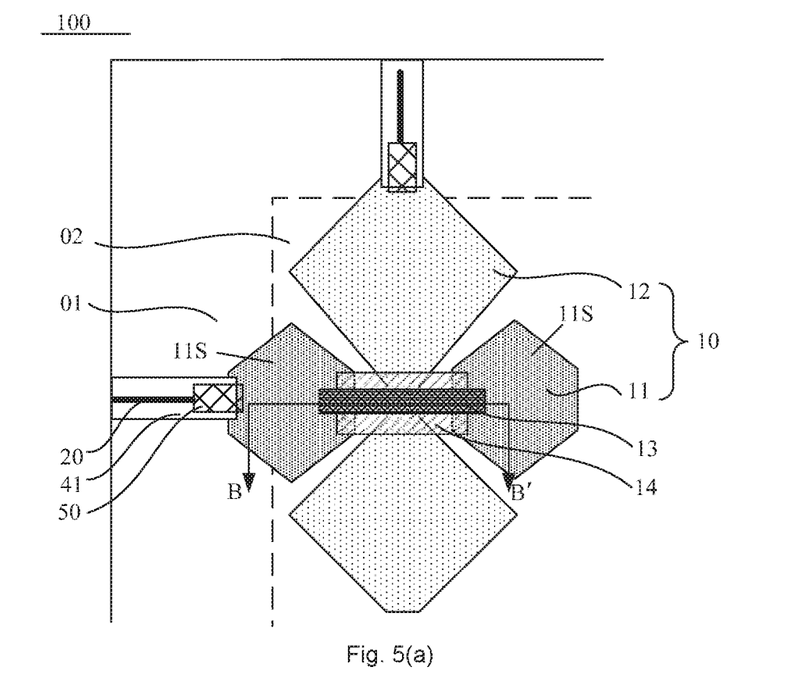
FIG. 5(a) is a schematic plan structural view of a touch substrate provided by an embodiment of the present disclosure.
Figure 5B:
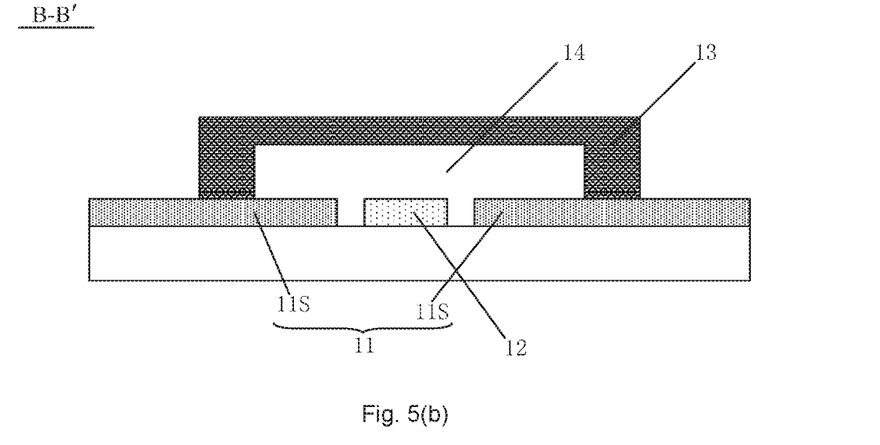
FIG. 5(b) is a schematic cross-sectional view along the direction of B-B' in FIG. 5(a)

Based on the above, for example, as shown in FIGS. 5 (a) and 5(b), the first touch electrode 11 is electrically connected through a bridge 13 in a region which the first touch electrode and the second touch electrode cross, wherein the first touch electrode 11 includes a plurality of first touch sub-electrodes 11S, and the plurality of first touch sub-electrodes 11S are electrically connected by the bridge 13. The bridge 13 is isolated from the second touch electrode 12 by an insulating block 14. The organic layer 40 is a first coating protection layer 41. The insulating block 14 is provided in a same layer with the first coating protection layer 41.

The coating protection layer is OC (Over Coating).

Based on this, for example, both the material of the first touch electrode 11 and the second touch electrode 12 are transparent conductive material, such as ITO (Indium Tin Oxide), IZO (Indium Zinc Oxide) and the like. The shape of the first touch electrode 11 or the second touch electrode 12 may be rhombus, bar, cross, snowflake or the like.

In the embodiment of the present disclosure, the insulating block 14 is provided in the same layer with the first coating protection layer 41. The material of the insulating block 14 and the first coating protection layer 41 is, for example, the same.

That is, by forming the insulating block 14 and the first coating protection layer 41 under a same patterning process, the number of patterning processes can be reduced and an aperture ratio can be increased.

Further, in order to reduce the number of patterning processes and make the touch substrate 100 lighter and thinner, in an embodiment of the present disclosure, for example, the bridge 13, the metal connecting bar 50 and the wiring 20 are disposed on a same layer. The material of the bridge 13, the metal connecting bar 50 and the wiring 20 are the same.

That is, the bridge 13, the metal connecting bar 50 and the wiring 20 are made of the same material, and formed under one patterning process.

In order to improve the aperture ratio of the touch substrate 100, in an embodiment of the present disclosure, for example, the bridge 13 is in a bar structure, and its length is 100~300 μm, and/or its width is 5~10 μm.

Figure 6A:
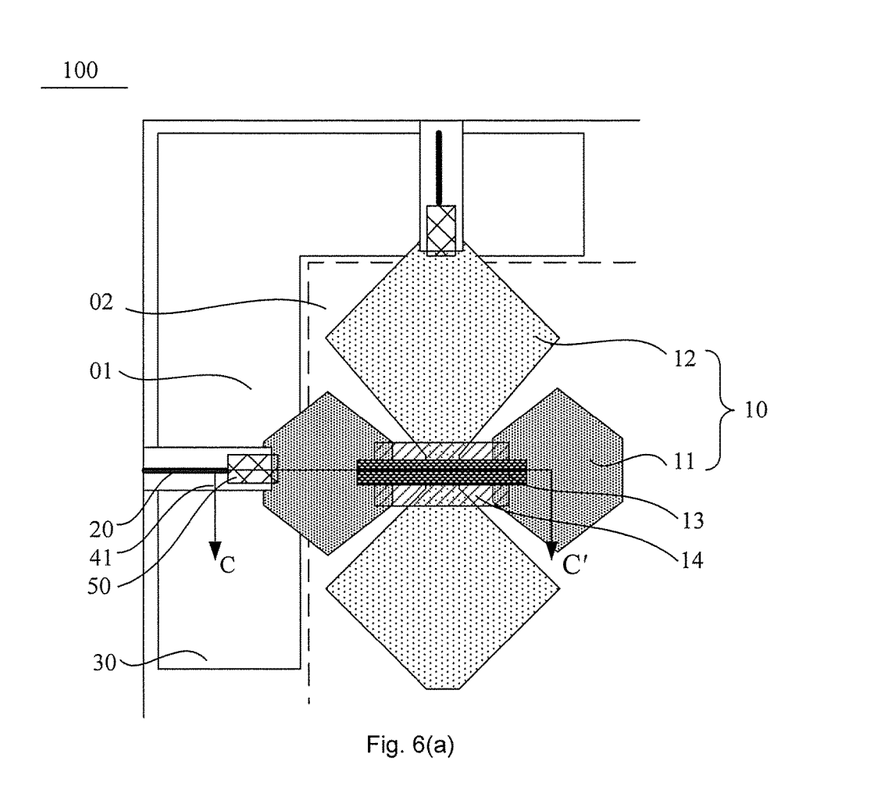
FIG. 6(a) is a schematic plan view of a touch substrate provided by an embodiment of the present disclosure.

A light shielding layer (for example, a white light shielding layer or a black light shielding layer) is used to shield the frame of a metal wiring electronic device. Therefore, in the embodiment of the present disclosure, for example, as shown in FIG. 6(a), the touch substrate 100 further includes a light shielding layer 30 disposed in the wiring region 01. The light shielding layer 30 is a white or black light shielding layer.

Since the light shielding layer 30 contains a conductive element and has certain conductivity, the problem of ESD (Electro-Static Discharge) may be caused between the metal connecting bar 50 and the light shielding layer 30 in the wiring region 01 of the touch substrate 100. As a result, the performance of the touch substrate 100 decreases, or even be damaged, thereby reducing the product yield. Therefore, as shown in FIG. 6(b), the light shielding layer 30 is located, for example, at the bottom of the touch substrate 100, so that the first coating protection layer 41 is located between the metal connecting bar 50 and the light shielding layer 30 to prevent ESD from being generated between the metal connecting bar 50 and the light shielding layer 30.

Figure 6B:
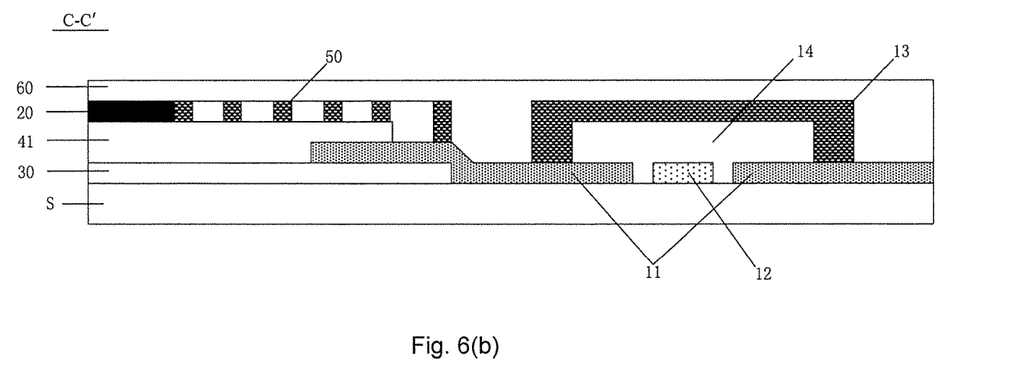
FIG. 6(b) is a schematic cross-sectional view along the direction of C-C' in FIG. 6(a)

For example, as shown in FIG. 6(b), a second coating protection layer 60 is disposed on the touch structure 10.

By disposing the second coating protection layer 60 on the touch structure 10, the embodiment of the present disclosure may serve the roles of blocking water and oxygen; protecting the bridge 13, the metal connecting bar 50 and the wiring 20.

Figure 7:
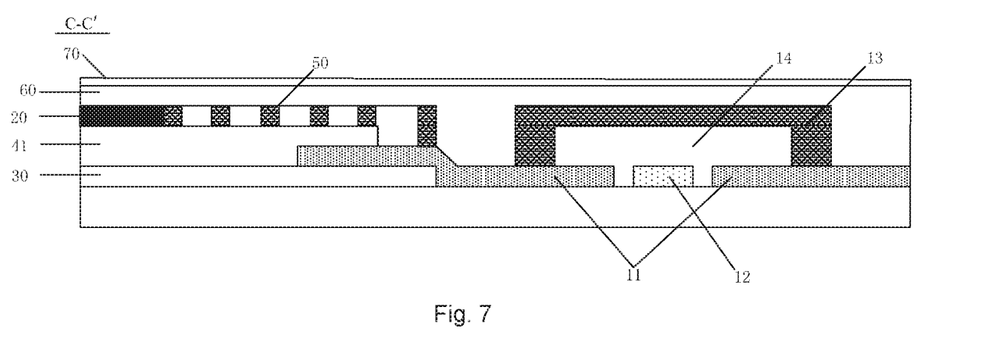
FIG. 7 is another schematic cross-sectional view along the direction of C-C' in FIG. 6(a)

For example, as shown in FIG. 7, an explosion-proof film 70 is disposed on the second coating protection layer 60.

The embodiment of the present disclosure provides the explosion-proof film 70 on the second coating protection layer 60 and provides the explosion-proof film 70 in an entire layer, so as to make the touch substrate 100 remain adhering to the explosion-proof film 70 and be prevented from scattering everywhere after broken. When the explosion-proof film 70 needs to be torn off and re-formed due to dust between the explosion-proof film 70 and the second coating protection layer 60 or other reasons, tearing off the explosion-proof film 70 easily causes the separation between the metal connecting bar 50 and the organic layer 40 as well. The present disclosure solves the problem that the metal connecting bar 50 is separated from the organic layer 40 due to tearing off the explosion-proof film 70, by providing the metal connecting bar 50 with a hollow portion.

Figure 8:
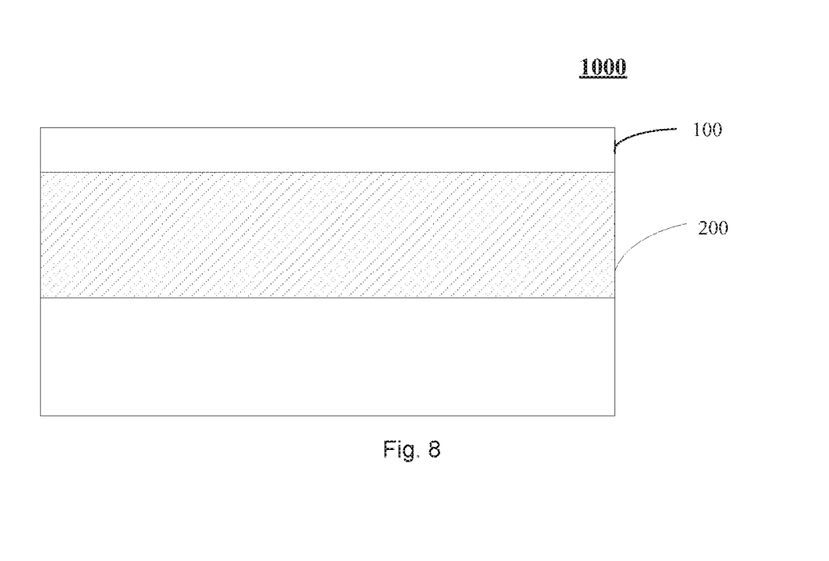
FIG. 8 is a schematic structural view of a touch display device provided by an embodiment of the present disclosure.

An embodiment of the present disclosure further provides a touch display device 1000 as shown in FIG. 8, which includes a display panel 200 and a touch substrate 100 as above described disposed on the light emitting side of the display panel.

The touch display device may be a product or a component having any display or touch function as a display, a television, a mobile phone, a tablet computer, or the like.

The display panel and the touch substrate 100 can be connected by OCR (Optical Clear Resin).

The embodiment of the present disclosure provides a touch display device. By disposing a metal connecting bar 50 in a wiring region 01 of the touch substrate 100 located on the light emitting side of the display panel, so as to make a first touch electrode 11 as well as a second touch electrode 12 be electrically connected with the wiring 20 through the metal connecting bar 50 respectively. A contact area between the wiring 20 and the first touch electrode 11, and a contact area between the wiring 20 and the second touch electrode 12 are accordingly increased, and thus metal impedance is reduced, so touch sensitivity is improved.

When the metal connecting bar 50 is disposed on an organic layer 40, the adhesion of the metal connecting bar 50 to the organic layer 40 is small due to differences in material properties between the metal connecting bar 50 and the organic layer 40. And when the metal connecting bar 50 is formed on the organic layer 40, a defect is easily formed between the organic layer 40 and the metal connecting bar 50, and the adhesion at the defect position is worse. In this way, when the touch substrate 100 needs rework, such as analysis, disassembly, repair or the like, the metal connecting bar 50 is to be subjected to a force in a tearing direction which make the metal connecting bar 50 separated from the organic layer 40. As a result, the metal connecting bar 50 is separated from the first touch electrode 11 or the second touch electrode 12, and thus signals on the touch structure 10 are unable to be transmitted to an IC, thereby affecting the touch function of a product and reducing product yield. Based on this, by making the metal connecting bar 50 have a hollow portion, the embodiment of the present disclosure may reduce a contact area between the metal connecting bar 50 and the organic layer 40, and thus reduce the probability of forming defects, resulting in reducing the probability of a separation between the metal connecting bar 50 and the organic layer 40 and improving the product yield.

For example, the display panel 200 is a liquid crystal display panel or an organic light emitting diode display panel.

When the display panel is a liquid crystal display panel, the display panel includes an array substrate, an alignment substrate and a liquid crystal layer disposed therebetween. The array substrate may include a TFT (Thin Film Transistor), and a pixel electrode electrically connected to the drain electrode of the TFT, and may further include a common electrode. The alignment substrate may include a black matrix and a color filter. The color filter may be disposed on the alignment substrate or on the array substrate. The common electrode may be disposed on the array substrate or on the alignment substrate.

When the display panel is an organic light emitting diode (abbreviated as OLED) display panel, it includes an array substrate and a package substrate. The array substrate may include a TFT, an anode and a cathode electrically connected to the drain electrode of the TFT, and an organic-material functional layer disposed between the anode and the cathode.

The foregoing descriptions merely show specific implementations of the present disclosure, but the protection scope of the present disclosure is not limited thereto. Any person of skill in the art can readily conceive of variations and replacements within the technical scope disclosed by the embodiments of the present disclosure, and these variations or replacements shall fall into the protection scope of the present disclosure.

The above descriptions merely show illustrative implementations of the present disclosure, not intended to limit the protection scope of the present disclosure. The protection scope of the disclosure is determined by the appended claims.

What is claimed is:

1. A touch substrate, comprising:
    a base substrate, including a main touch region and a wiring region;
    a touch structure, at least a part of which is located in the main touch region;
    a plurality of connecting members and a plurality of wirings, at least partially located in the wiring region; and
    an organic layer, a part of which is located on the touch structure, wherein
    the plurality of connecting members are located on the organic layer, and an orthographic projection of at least one connecting member on the base substrate partially overlap with an orthographic projection of the touch structure on the base substrate,
    the plurality of connecting members are configured to electrically connect the touch structure and respectively connect the plurality of wirings,
    a contact area between the connecting members and the touch structure is larger than that between the connecting members and the plurality of wirings,
    at least one connecting member of the plurality of connecting members has a hollow portion, and
    each of the plurality of connecting members includes two intersecting sets of metal wires, each set of metal wires includes a plurality of metal wires parallel to each other, and the two intersecting sets of metal wires are located in different directions.

2. The touch substrate according to claim 1, wherein each of the at least one connecting member is in a mesh structure.

3. The touch substrate according to claim 1, wherein a length of each of the at least one connecting member is 1~5 mm.

4. The touch substrate according to claim 1 wherein a width of each of the at least one connecting member is 0.2~0.3 mm.

5. The touch substrate according to claim 1, wherein the touch structure comprises a first touch electrode and a second touch electrode which are insulated from and intersect with each other, the first touch electrode comprises a plurality of first touch sub-electrodes, and the plurality of first touch sub-electrodes are electrically connected by a bridge; the bridge are isolated from the second touch electrode by an insulating layer;
    the organic layer and the insulating layer are located in a same layer and made of same material.

6. The touch substrate according to claim 1, wherein the organic layer is a first coating protection layer.

7. The touch substrate according to claim 5, wherein the bridge, the plurality of connecting members and the plurality of wirings are in a same layer and made of same material.

8. The touch substrate according to claim 5, wherein the bridge is in a bar structure;
    a length of the bridge is 100~300 μm.

9. The touch substrate according to claim 5, wherein a width of the bridge is 5~10 μm.

10. The touch substrate according to claim 1, further comprising a light shielding layer disposed in the wiring region.

11. The touch substrate according to claim 10, wherein the light shielding layer is a white light shielding layer or a black light shielding layer.

12. The touch substrate according to claim 1, further comprising a second coating protection layer overlapping the touch structure.

13. The touch substrate according to claim 12, wherein an explosion-proof film is disposed on the second coating protection layer.

14. The touch substrate according to claim 1, wherein each of the at least one connecting member is a metal connecting bar.

15. A touch display device, comprising: a display panel, and a touch substrate disposed on a light emitting side of the display panel, wherein the touch substrate is the touch substrate according to claim 1.

16. The touch display device according to claim 15, wherein the display panel is a liquid crystal display panel or an organic light emitting diode display panel.

* * * * *